United States Patent
McQuade et al.

(10) Patent No.: US 6,362,734 B1
(45) Date of Patent: Mar. 26, 2002

(54) METHOD AND APPARATUS FOR MONITORING SEAT BELT USE OF REAR SEAT PASSENGERS

(75) Inventors: Thomas M. McQuade, Ann Arbor; Steven Yellin Schondorf, Dearborn; Scott Howard Gaboury, Ann Arbor, all of MI (US)

(73) Assignee: Ford Global Technologies, Inc., Dearborn MI ( * ) Notice: Subject to any disclaimer, the term of this patent is extended or adjusted under 35 U.S.C. 154(b) by 0 days.

(21) Appl. No.: 09/773,317

(22) Filed: Jan. 31, 2001

(51) Int. Cl.[7] ............................................. G08B 21/00
(52) U.S. Cl. .................... 340/457.1; 340/438; 340/439; 180/267; 200/61.58 B; 280/801.1; 701/45
(58) Field of Search .............................. 340/457.1, 438, 340/439, 666; 180/268, 270; 200/61.58; 280/801.1, 807, 808; 701/45

(56) References Cited

U.S. PATENT DOCUMENTS

| | | | |
|---|---|---|---|
| 3,624,601 A | 11/1971 | Routzahn | 340/457.1 |
| 3,875,556 A | 4/1975 | Beaird | 340/457.1 |
| 4,849,733 A | 7/1989 | Conigliaro et al. | 340/457.1 |
| 5,260,684 A | 11/1993 | Metzmaker | 340/457.1 |
| 5,483,221 A | 1/1996 | Mutter et al. | 340/457.1 |
| 5,581,234 A | 12/1996 | Emery et al. | 340/457.1 |
| 5,804,887 A | 9/1998 | Holzapfel et al. | 307/191 |
| 6,043,736 A | 3/2000 | Sawahata et al. | 340/438 |
| 6,204,757 B1 * | 3/2001 | Evans et al. | 340/439 |
| 6,215,395 B1 * | 4/2001 | Slaughter et al. | 340/457.1 |

* cited by examiner

Primary Examiner—Edward Lefkowitz
Assistant Examiner—Davetta W. Goins
(74) Attorney, Agent, or Firm—Gary A. Smith

(57) ABSTRACT

A system for monitoring the secured/unsecured status of seat belts in rear seating rows of a vehicle notes the number and/or location of seat belts secured at a base time when all doors are closed and the vehicle starts in motion. The vehicle operator is alerted to any later change in the number of secured belts by a visual display provided by a vehicle message center and/or an audible signal. When the vehicle slows to a stop and a door opens, the number of secured belts is reset to allow continued monitoring of rear seat occupants after occupants are dropped off and/or picked up. The secured/unsecured condition may be determined by monitoring a retractor reel of the seat belt, the secured condition being defined by the seat belt being paid out beyond a threshold length and the unsecured condition being defined by the seat belt being retracted shorter than the threshold length. Seat occupancy sensors are not required, and rear seat occupants may temporarily unfasten their seat belt as necessary to move from one seating position to another without continuous alerting of the vehicle operator.

24 Claims, 3 Drawing Sheets

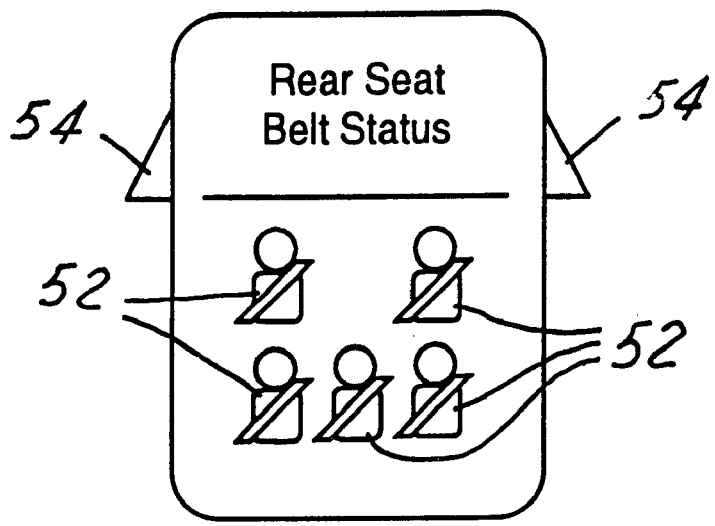
FIG. 3
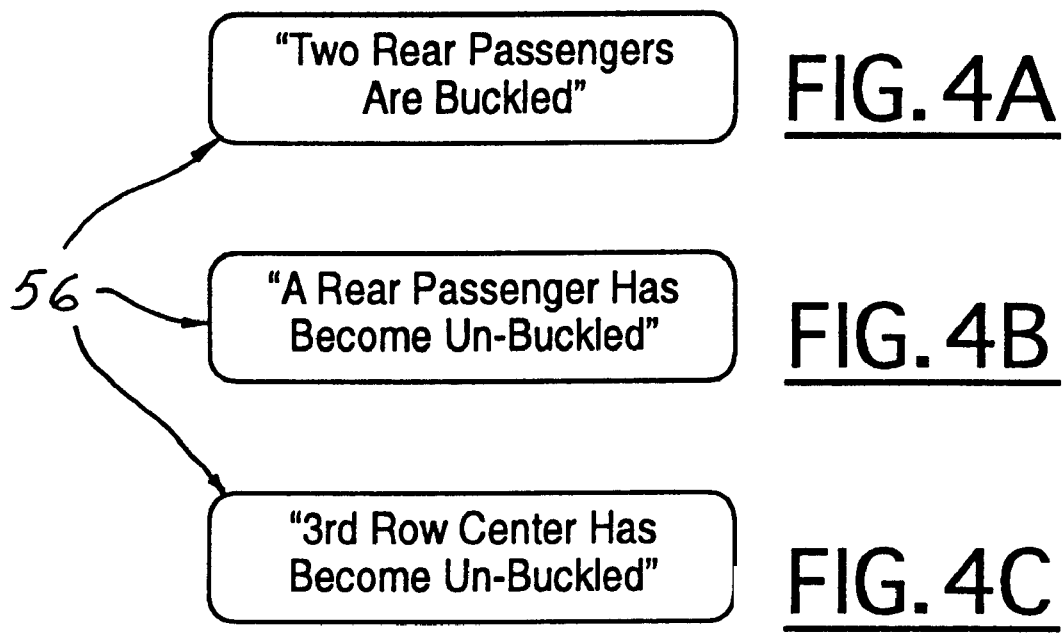
FIG. 4A
FIG. 4B
FIG. 4C

METHOD AND APPARATUS FOR MONITORING SEAT BELT USE OF REAR SEAT PASSENGERS

FIELD OF THE INVENTION

This invention relates to seat belt usage indicating systems, and more particularly to such a system that monitors the seat belt usage of occupants in rear seating rows and alerts the vehicle operator to the fact that a rear seat passenger is no longer securely belted.

BACKGROUND OF THE INVENTION

Automotive vehicles generally include seat belt usage indicating systems for occupants of the front row seating positions of the vehicle. These systems are intended to provide a reminder to the front seat occupants if they fail to properly fasten their seat belts when the vehicle is in operation.

Since such a reminder is only appropriate and useful when a particular seat is actually occupied, most prior art systems use a seat occupancy sensor to determine the presence of an occupant in a particular seat. Such sensors typically comprise a pressure-sensing bladder or a load-responsive electrical switch installed within the seat. These prior art systems require special seat construction and wiring.

In view of the wide acceptance and use of seat belts, and the practice of many drivers to ensure that all passengers riding in the vehicle are properly buckled up before driving, it is very useful for the driver to know if a passenger's seat belt becomes disconnected or disengaged during driving. The driver cannot easily monitor the seat belt use of passengers, especially rear seat passengers, during driving since his/her attention is properly directed to the act of driving.

In view of the above, it would be advantageous to provide a seat belt monitoring system that provides the vehicle operator with information as to the status of the seat belts in rear seating rows both prior to and during a trip.

An example of a seat belt usage indicating system appropriate for rear seats is disclosed in U.S. Pat. No. 5,483,221. In this patent, a system monitors the seat belts in a motor vehicle and a reminder is initiated in response to a belt buckle sensor indicating an engaged or non-engaged state of the buckle. A vehicle sensor indicates when the vehicle is in use, and an annunciator produces an audible reminder if any belt that was initially engaged becomes disengaged. Thus, monitoring of the continued buckling of a seat belt is provided without need for seat occupancy sensors. The system, however, does not allow for continued monitoring of seat belt use if seat occupancy changes because of passengers being dropped off, picked up, or changing seats. Also, the system does not provide any indication to the vehicle operator how many passengers are properly buckled at the start of a trip.

SUMMARY OF THE INVENTION

The present invention monitors the secured/unsecured status of seat belts in rear seating rows in a manner not requiring seat occupancy sensors, and allows the rear seat passengers to temporarily unfasten their seat belt as necessary to move from one seating position to another without continuous alerting of the vehicle operator. The invention also allows continued monitoring of rear seat passengers after the number of belted passengers changes due to the dropping off and/or picking up of passengers.

These and other advantages are achieved by the monitoring and alerting system comprising a plurality of seat belt sensors for producing belt status signals indicating the secured/unsecured condition of each seat belt in the rear seating rows, a display for producing a visible indication of the status of at least one of the seat belts, and a control module coupled to the seat belt sensors to receive the belt status signals and coupled to the display. The control module causes the display to indicate an initial number of the rear seat belts in the secured condition at a base time, causes the display to provide a visible alert message to indicate if the number of belts in the secured condition falls below the initial number after the base time, and terminates the alert message if the number of belts in the secured condition returns to the initial number.

In a preferred embodiment of the invention, the system further comprises an annunciator for producing an audible alerting signal. In a further preferred embodiment of the invention, the secured/unsecured condition is determined by monitoring a retractor reel of the seat belt, the secured condition being defined by the seat belt being paid out beyond a threshold length and the unsecured condition being defined by the seat belt being retracted shorter than the threshold length.

In a further preferred embodiment of the invention, the base time is established by a vehicle in-use signal that indicates one or more of the following conditions: when electrical power is applied to vehicle electrical systems, when the vehicle has reached a predetermined speed, and/or when one or more of the vehicle doors is closed.

In a further aspect of the invention, the visible display is provided by a vehicle message center providing information as to which of the rear row seating positions are initially in the secured condition, and which of the initially secured positions transition to the unsecured condition.

The present invention also comprises a method of a monitoring the status of seat belts in a rear seating row.

BRIEF DESCRIPTION OF THE DRAWINGS

FIG. 3 shows a display for providing a symbolic visual indication of seat belt status; and FIGS. 4A–4C show examples of text messages for providing indications of seat belt status.

DETAILED DESCRIPTION OF THE PREFERRED EMBODIMENTS

Figure 1:
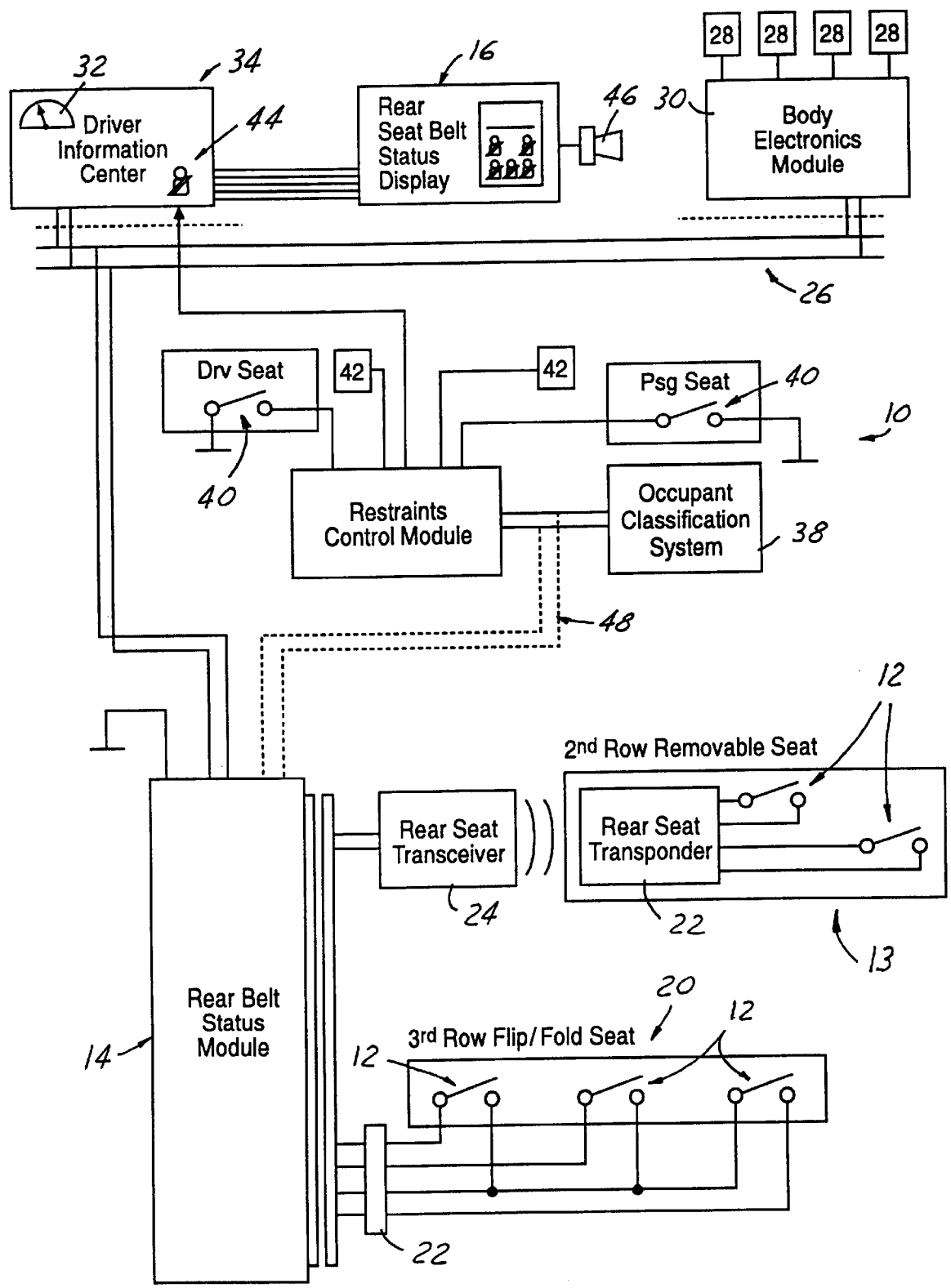
FIG. 1 is a schematic diagram showing a system architecture of a preferred implementation of the present invention.

Referring to FIG. 1, a rear seat belt monitoring system 10 according to a preferred embodiment of the invention is shown integrated with a vehicle restraint system. The seat belt monitoring system 10 includes a plurality of seat belt status sensors 12 associated with seat belts in two rear seating rows of the vehicle and generating electric signals indicating whether the respective seat belts are in a secured or an unsecured condition, a rear belt status module (RBSM) 14 executing a program or algorithm controlling operation of the system, and a rear seat belt status display (RSBSD) 16 providing a visual indication of the status of one or more of the seat belts.

The seat belt status sensors 12 may be buckle sensors that generate signals indicating whether the respective seat belt buckle is fastened or unfastened. Buckle sensors may operate in any appropriate manner to detect whether the seat belt latch plate (not shown) is fully inserted into the buckle (not shown). Alternatively, the seat belt status sensors 12 may cooperate with seat belt reels or retractors (not shown) to detect whether the seat belt is retracted, as is the case when the seat belt is not in use, or paid out beyond a threshold length as is necessary in order to fasten the seat belt around the body of a seat occupant. The schematic symbols used to indicate the sensors 12 in FIG. 1 are not meant to limit the invention to any particular type of switch or sensor.

In FIG. 1, the rear seat belt monitoring system 10 is shown adapted for use in a vehicle having a removable second row seat 18 and a non-removable third row seat 20, such as a flip/fold bench seat as is sometimes found in a minivan. The third row seat 20 is provided with seat belt status sensors 12 at three seating positions, and the sensors are connected to the RBSM 14 by hard-wired electrical connections 22, as commonly known in the vehicle electrical system arts. The second row seat 18 is provided with seat belt status sensors 12 at two seating positions, and the sensors are connected to the RBSM 14 by a wireless electrical connection.

The wireless connection comprises a transponder 22 disposed in or on the second row removable seat 18 and electrically connected with the seat belt status sensors 12, and a transceiver disposed on the vehicle and electrically connected with the RBSM 14. The transceiver 24 is located so that it is closely adjacent to the transponder 22 when the second row removable seat 18 is installed in the vehicle and properly latched in position. The transceiver 24 and transponder 22 preferably communicate via a radio frequency data link. The transceiver 24 receives power from the RBSM 14 or a separate connection with the vehicle electrical system (not shown) and radiates electromagnetic energy in the radio frequency spectrum. The transponder 22 is a non-powered device that receives the energy radiated by the transceiver 24 and responds back to the transceiver, communicating the belt status signal from each seat belt status sensor 12 to the transceiver, which passes the status signals on to the RBSM 14. RF data links similar in concept of operation are in automotive use today. An example of such a system is the SECURILOCK® engine immobilizer system featured on passenger vehicles sold by the Ford Motor Company.

If desired, both the second row and third row seats 20,22 may be connected to the RBSM 14 via the wireless transceiver 24/transponder 22 system described. Separate removable bucket seats (not shown) may also be provided in either of the rows, and these may be equipped with individual transponders to communicate with vehicle-mounted transceivers.

The wireless transceiver 24/transponder 22 system allows the seats to be removed and reinstalled without the need to manually disconnect and reconnect conventional pin-and-socket electrical connectors. This reduces the likelihood of damage to the connectors that may be caused by misalignment during the mating process, and eliminates the problem of protecting the connectors against contamination by dirt or debris when the seats are removed.

The RBSM 14 is preferably a microprocessor-based device that monitors and interprets the signals from the seat belt status sensors 12 to determine whether the rear seat belts are secured or unsecured. The RBSM 14 is preferably connected with a main vehicle electronic communications bus (also known as a controller area network or CAN bus) 26 so that it may receive inputs from other vehicle systems to allow it to perform the necessary algorithm to be described below. For example, the RBSM 14 receives door closed/ajar status from one or more door-ajar sensors 28 associated with respective vehicle doors (not show), relayed via a body electronics module 30. As a further example, the RBSM 14 receives vehicle speed information from a speedometer 32 which may be included within a driver information center 34 or instrument cluster.

As is well known in the advanced occupant restraints art, a restraints control module (RCM) 36 receives inputs from a plurality of sensors, such as a crash sensor (not shown), an occupant classification sensor 38, a seat position sensor (not shown), and driver and front seat passenger seat belt status sensors 40. Using inputs from the various sensors, the RCM 36 performs an algorithm that controls the functioning of one or more occupant restraints such as airbags 42 or seat belt pretensioners (not shown).

Driver and front seat passenger seat belt status sensors 40 may be belt buckle sensors, retractor payout sensors, or any appropriate type of sensor for indicating whether or not the seat belt is properly fastened around an occupant of the seat. The occupant classification system 38 is also of the type known in the art, and may comprise a weight sensor and/or a non-contact occupant sensor such as a capacitive, ultrasonic, infrared, or other appropriate sensor.

The driver information center 34 is electronically connected with the RCM 36 and may include an indicator light 44 providing a visual display of the status of the driver and/or front passenger seat belts. The RBSD 16 is shown electrically connected with the RBSM 14 through the driver information center 34. Alternatively, it is possible to connect the RSBSD 16 directly with the RBSM 14 through the CAN bus 26 or a separate connection, bypassing the driver information center 34.

An annunciator 46 for providing an audible signal to the vehicle occupants is also connected with the RBSM 14, either through the RSBSD 16 as shown or via a separate connection to the CAN bus 26. The annunciator 46 may, for example, be a horn, buzzer or chime, or a speaker and associated system for providing a recorded or synthesized voice warning.

If it is desired for the RBSM 14 to generate warnings related to the front seat belts in addition to the rear seat belts, a connection may be provided between the RBSM 14 the RCM 36. Such a connection is indicated by dotted lines 48 in FIG. 1.

The RBSM 14 is shown in FIG. 1 as a separate unit from the RCM 36 so that the rear seat belt warning system 10 may be added to a vehicle already equipped with an RCM 36 controlling the front seat restraints. As an alternative, it is possible to integrate the RCM 36 and the RBSM 14 into a single module combining the functionality of the two units as described It is also possible to include the RBSM 14 functionality in the driver information center 34, as may be desirable if the driver information center 34 has sufficient microprocessor capacity and connector pin availability.

The rear seat belt monitoring system 10 may also be integrated or combined with certain of the components and/or functionality of a seat belt reminder system for the first row seating positions. Primary and secondary reminder systems of this type are taught in copending U.S. patent application Ser. Nos. 09/488,352 and 09/715,236, the disclosures of which are incorporated herein by reference.

Figure 2:
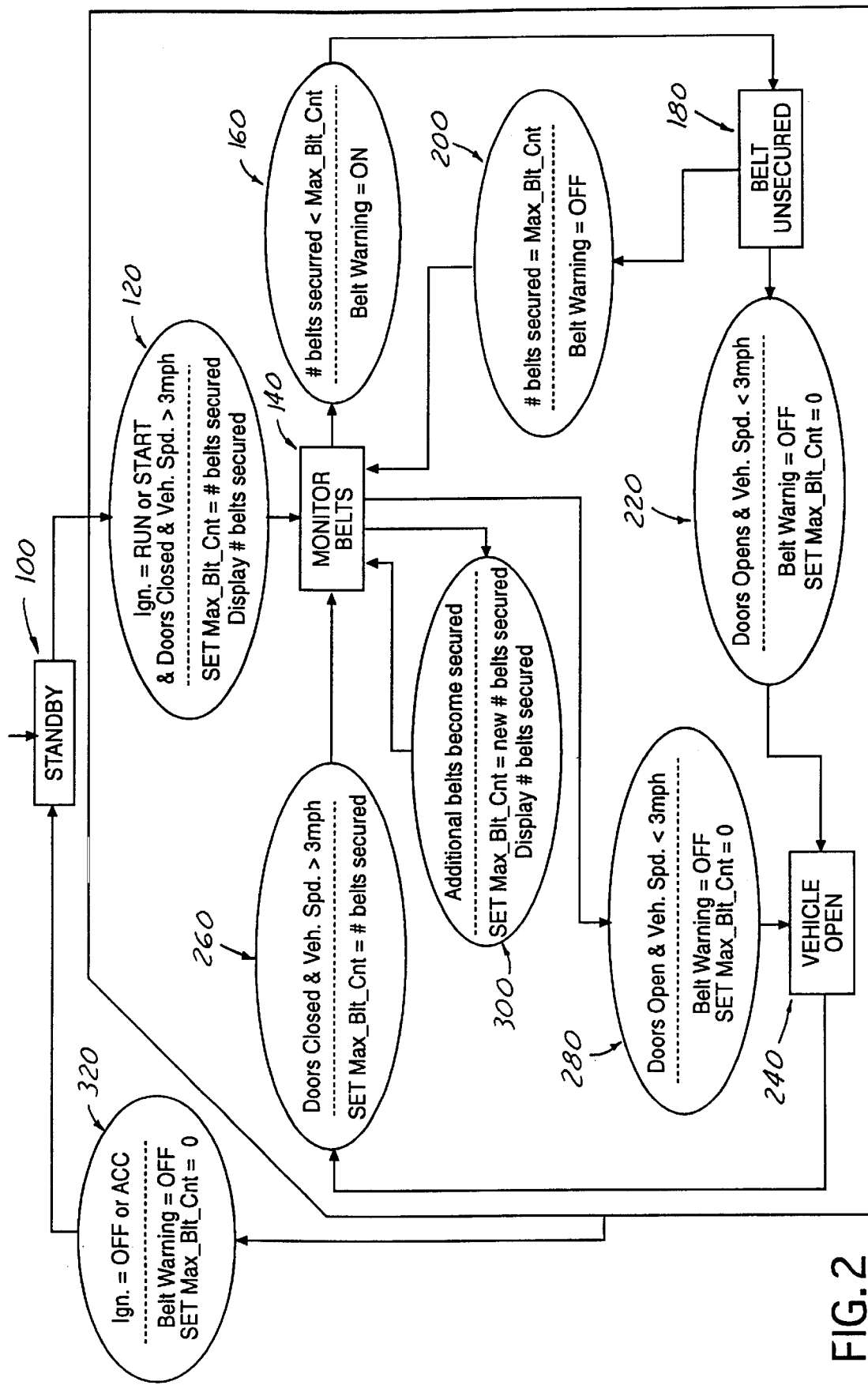
FIG. 2 is a state transition diagram showing operation of the system in FIG. 1.

Referring now to FIG. 2, an algorithm performed by a system according to the present invention will be described.

Rectangular boxes are used to indicate system states. Arrows lead from one state to the next, with ovals at intervening positions. Within each oval, vehicle system conditions are stated above the dashed line, and system actions resulting from these conditions are stated below the dashed line.

Before electrical power is applied to the vehicle, the invention seat belt monitoring and alerting system is in a standby condition, indicated by block 100. A driving cycle begins when electrical power is applied to the vehicle (for example by moving an ignition switch to RUN or START), all vehicle doors are closed (as indicated by the door status switches 28), and the vehicle speed is greater than a predetermined speed, for example 3 miles per hour (as indicated by the speedometer 32). See block 120. These three conditions combine to establish a "vehicle in-use" condition and thereby establish a base time. A Max_Blt_Cnt value is set equal to the number of rear seat belts secured at the base time, and this number of secured belts is displayed on the RSBSD 16. If desired, and depending upon the type of display utilized for the system, the display may also indicate the seating positions which have a secured belt and/or which seating positions have an unsecured belt.

As seen at block 140, the state of the seat belt monitoring and alerting system is now MONITOR BELTS, with each of the rear seat belt sensors being monitored for changes in status. A first condition that can change the state of the system is if the number of belts secured declines to a number less than the Max_Blt_Cnt value previously set, as indicated at block 160. If this occurs, the rear belt status display 16 provides a visual alert message to indicate to the driver that at least one of the belts has become unsecured. For convenience of notation, this condition is stated in FIG. 2 as "Belt Warning=ON." The state of the system is now BELT UNSECURED, see block 180.

The BELT UNSECURED state terminates if the number of belts secured returns to a value equal to the Max_Blt_Cnt, as seen in block 200. When this occurs, the belt warning presented on the RSBSD 16 is switched off and the system state returns to MONITOR BELTS, block 140.

In block 200, the return of the number of secured belts to Max_Blt_Cnt may be achieved in either of two fashions: 1) the belt that was initially secured and which triggered the alert signal when it was unfastened is re-secured; or 2) a different belt which was not initially secured is secured. This second case will occur when a passenger who was properly belted at the base time switches from one seating location to another, and properly fastens his/her seat belt at the new seating location.

Another way for the BELT UNSECURED status to change is if one or more of the vehicle doors are opened and the vehicle speed drops to below a predetermined speed, 3 miles per hour for example, as shown at block 220. This indicates that the vehicle operator is slowing to drop off or pick up additional passengers, and so it is expected that the number of belted passengers will change. Therefore, the belt warning is switched off and the Max_Blt_Cnt is reset to zero. With the system now in the VEHICLE OPEN state, block 240, the vehicle doors may return to a closed condition and the vehicle speed increase to above 3 mph. See block 260. Upon achieving these conditions, the Max_Blt_Cnt is again set to the number of belts secured as indicated by the seat belt sensors, and the system returns to the MONITOR BELTS state, block 140.

A short time delay is preferably incorporated into the algorithm so that the belt warning will not be switched on unless the number of belts secured is less than Max_Blt-Cnt for longer than a predetermined period of time. This time delay will permit a rear seat passenger to unfasten and quickly re-fasten their belt for comfort reasons, or to quickly change from one seating position to another without alerting the vehicle operator.

It is also possible for the system to transition directly from MONITOR BELTS 140 to the VEHICLE OPEN 240 state if, as indicated at block 280, one or more vehicle doors are opened and the vehicle speed decreases to below 3 mph. It that situation, the belt warnings are turned off and Max_Blt_Cnt is reset to zero in preparation for a change in the number of belted passengers. A return to the MONITOR BELT state occurs via block 260 as previously described.

In another situation, during the MONITOR BELTS state additional belts may become secured, as shown in block 300. If this occurs, Max_Blt_Cnt is reset to equal the new, increased number of belts secured and this number of belts secured is displayed to the vehicle operator.

The system may return to STANDBY 100 from any condition or state when vehicle electrical power ceases, as by switching the ignition to OFF or ACCessory, causing the belt warnings, if activated, to be turned off and Max_Blt_Cnt to be reset to zero. See block 320.

At a minimum, the alert message must indicate merely that at least one belt in the rear seating rows that was secured at the base time has become unsecured. This will allow the vehicle operator to take whatever steps are necessary to ensure that all rear seat passengers are properly wearing their seat belts. Preferably, however, the alerting message also indicates the location of any seat belt that has become unsecured.

FIG. 3 illustrates one possible example of a symbolic visual display 50 for alerting the vehicle operator to the status of the rear seat belts. The display 50 has a separate symbol 52 representing each of five seating positions in the second and third rows. Each symbol 52 may be separately and selectively illuminated to provide a warning or indication that the seat belt at that position which was originally secured has become unsecured. It is also possible for the symbols 52 to be illuminated in a first color during normal conditions when the seat belt at that position has been fastened, and transition to a second color, such as red, when that seat belt transitions to an unsecured condition. Triangular symbols 54 on either side of the display may be illuminated to indicate a "door ajar" condition on the left and/or right hand side of the vehicle. The entire display 50 may be illuminated as a test at initial switch on of the vehicle ignition, as is well known in the art.

FIGS. 4A–4C indicate possible messages that may be provided on a text message display 56, either as an alternative to or in addition to the symbolic display of FIG. 3, to alert the vehicle operator to the rear seat belt status. FIG. 4A shows a text message indicating the total number of rear seat passengers that are buckled, for example at block 120. If the number of belts secured drops below the initial Max_Blt_Cnt value, a text message such as shown in FIG. 4B may be displayed. Alternatively, a message such as FIG. 4C may be displayed, indicating not only that a passenger has become unbuckled, but that a specific seating position has become unbuckled.

Any of the above displays as shown in FIGS. 3–4 may be accompanied by audible alerts provided by the annunciator 46, such as a chime, horn, bell to draw the vehicle operators attention to the visual display, or synthetic or recorded voice messages to provide general or specific information on the status of the rear seat belts.

Various other modifications and variations will no doubt occur to those skilled in the arts to which this invention pertains. Such variations and modifications, which generally rely on the teachings through which this disclosure has advanced the art, are properly considered within the scope of this invention. This disclosure should thus be considered illustrative, not limiting; the scope of the invention is instead defined by the following claims.

We claim:

1. A seatbelt monitoring and alerting system for informing a vehicle operator of the status of a plurality of seatbelts in at least one rear seating row of a vehicle comprising:
   a plurality of seatbelt sensors for producing belt status signals indicative of a secured condition or an unsecured condition of each of the seatbelts;
   a display for producing a visible indication of the status of at least one of the seatbelts; and
   a belt status module coupled to the seatbelt sensors to receive the belt status signals and coupled to the display to:
   a) cause the display to indicate an initial number of the seatbelts in the secured condition at a base time;
   b) cause the display to provide a visible alert message to indicate if the number of seatbelts in the secured condition falls below the initial number after the base time; and
   c) terminate the alert message if the number of seatbelts in the secured condition returns to the initial number.

2. The apparatus as set forth in claim 1 further comprising an annunciator for producing an audible alerting signal.

3. The apparatus as set forth in claim 1 wherein the unsecured condition is identified by a buckle of the seatbelt being unfastened and the secured condition is identified by the buckle being fastened.

4. The apparatus as set forth in claim 1 wherein the status of the seatbelts is determined by monitoring a retractor reel of the seatbelt, the secured condition being defined by the seatbelt being paid out beyond a threshold length and the unsecured condition being defined by the seatbelt being retracted shorter than the threshold length.

5. The apparatus as set forth in claim 1 wherein the base time is established at least in part by a vehicle in-use signal generated by one or more vehicle systems.

6. The apparatus as set forth in claim 5 wherein the vehicle in-use signal indicates that electrical power has been applied to vehicle electrical systems.

7. The apparatus as set forth in claim 5 wherein the vehicle in-use signal indicates that the vehicle has reached a predetermined speed.

8. The apparatus as set forth in claim 5 wherein the vehicle in-use signal indicates that at least one door of the vehicle is closed.

9. The apparatus as set forth in claim 1 wherein the display comprises a text message display.

10. The apparatus as set forth in claim 1 wherein the display comprises a symbolic display.

11. The apparatus as set forth in claim 1 wherein at least one of the seatbelt sensors is coupled to the belt status module by a wireless electrical connection.

12. The apparatus as set forth in claim 11 wherein the wireless electrical connection comprises a transponder connected to the seatbelt sensor and a transceiver connected to the belt status module.

13. A method of monitoring the status of a plurality of seatbelts in at least one rear seating row of a vehicle and alerting a vehicle operator to said status comprising:
   detecting the status of each of the seatbelts as between a secured condition and an unsecured condition at a base time;
   providing a visible indication of an initial number of the seatbelts in the secured condition at the base time;
   providing a visible alert message indicating if the initial number of seatbelts in the secured condition decreases to a reduced number after the base time; and
   terminating the alert message if the reduced number of seatbelts in the secured condition returns to the initial number.

14. The method as set forth in claim 13 wherein the step of providing the alert message is delayed until the reduced number has existed for a predetermined length of time.

15. The method as set forth in claim 13 wherein the step of terminating the alert message is accomplished if, after a first seatbelt included in the initial number changes status to the unsecured condition to achieve the reduced number, the return to the initial number is achieved by a second seatbelt not included in the initial number subsequently changing status to the secured condition.

16. The method as set forth in claim 13 wherein the step of terminating the alert message is accomplished if, after a first seatbelt included in the initial number changes status to the unsecured condition to achieve the reduced number, the return to the initial number is achieved by the first seatbelt subsequently returning to the secured condition.

17. The method as set forth in claim 13 wherein the visible indication of the number of the seatbelts in the initial secured condition includes an indication of the location of the seatbelts in the initial secured condition.

18. The method as set forth in claim 13 wherein the visible alert message includes an indication of the location of the seatbelts that have transitioned to the unsecured condition.

19. The method as set forth in claim 13 wherein the base time is established by detecting a vehicle in-use signal.

20. The method as set forth in claim 19 wherein the vehicle in-use signal comprises an indication that the vehicle has reached a predetermined speed.

21. The method as set forth in claim 19 wherein the vehicle in-use signal comprises an indication that an ignition switch has moved to an on condition.

22. The method as set forth in claim 19 wherein the vehicle in-use signal comprises an indication that at least one door of the vehicle is closed.

23. The method as set forth in claim 13 further comprising the step of sounding an audible alert in conjunction with the visible alert message.

24. A method of monitoring the status of a plurality of seatbelts in at least one rear seating row of a vehicle and alerting a vehicle operator to said status comprising:
   establishing a base time when at least the following three conditions are met: electrical power is applied to the vehicle, at least one door of the vehicle is closed, and the vehicle has reached a predetermined speed;
   detecting the status of each of the seatbelts as between a secured condition and an unsecured condition at the base time;
   providing a visible indication of an initial number of the seatbelts in the secured condition at the base time;
   providing a visible alert message indicating if the number of seatbelts in the secured condition falls below the initial number after the base time;
   sounding an audible alert in conjunction with the visible alert message; and
   terminating the audible alert and the alert message if the number of seatbelts in the secured condition returns to the initial number.

* * * * *